United States Patent

[11] 3,583,202

[72] Inventor Marvin J. Blakeway
 1690 Tracy Blvd., Apt. 7,
 Tracy, Calif. 95376
 Sacramento, Calif.
[21] Appl. No. 801,532
[22] Filed Feb. 24, 1969
[45] Patented June 8, 1971

[54] DEVICE FOR CRIMPING WEIGHTS ON FISHING LINES
5 Claims, 10 Drawing Figs.
[52] U.S. Cl. .................................................. 72/410,
 29/212
[51] Int. Cl. ................................................. B21d 9/08
[50] Field of Search .......................................... 72/409,
 410; 29/212

[56] References Cited
UNITED STATES PATENTS

| | | | |
|---|---|---|---|
| 2,790,341 | 4/1957 | Keep et al. ..................... | 29/212 |
| 3,371,400 | 3/1968 | Edes ............................. | 72/410 |
| 2,844,980 | 7/1958 | Johnson ........................ | 72/409 |
| 2,612,932 | 10/1952 | Vinson ......................... | 29/212 |
| 2,194,748 | 3/1940 | Glaser et al. ................... | 72/410 |

*Primary Examiner*—Charles W. Lanham
*Assistant Examiner*—Michael J. Keenan
*Attorney*—Alexander B. Blair ABSTRACT: A tubular holder or cartridge containing a plurality of end-to-end weights spring urged in one direction is held within a scissorlike operating structure, movement of the handles of which controls the feeding of the weights one at a time to the crimping end of the structure and controls the crimping of the weights about a line.

PATENTED JUN 8 1971

3,583,202

INVENTOR.
MARVIN J. BLAKEWAY
BY
Alexander B. Blair
ATTORNEY.

DEVICE FOR CRIMPING WEIGHTS ON FISHING LINES

BACKGROUND OF THE INVENTION

It is a common practice to form weights or sinkers for fishing lines with a groove in one end thereof and to insert a fishing line in said groove and then crimp the split end of the weight around the line. The weights are usually made of lead so that the crimping action can take place relatively easily, but it is a tedious manual operation, particularly when a number of lines are to be provided with weights.

SUMMARY OF THE INVENTION

The device comprises a pair of lever arms pivoted to partake of a scissorlike action, the arms at one end being provided with a crimping chamber adapted to receive weights, the split ends of which are adapted to be crimped by such lever ends about the lines when the opposite ends of the lever arms, serving as handles, are pressed together. The device contains a tube having lead weights therein in end-to-end contacting relationship and urged toward the crimping end of the device by a coil spring. Pivoted fingers adjacent the crimping end of the device engage the weight in the adjacent end of the cartridge to prevent its movement until the crimping chamber is ready to receive it. The action of moving the arms of the levers toward each other short of their limit of movement performs the crimping action on one weight. Releasing the arms releases the crimped weight, whereupon complete compression of the arms releases the next following weight for movement into the crimping chamber. Subsequent releasing of the lever arms permits the pivoted fingers to swing inwardly over the end of the cartridge to prevent movement of the next following weight from the cartridge until the following crimping operation takes place.

The cartridge tube is received freely in a container tube, usually the cartridge tube permitting the use of cartridges containing weights of different sizes. The tube receiving the cartridge is engaged by springs at diametrically opposite sides urging the lever arms of the device away from each other, and such tube also carries means engageable with the lever arms to limit their movement away from each other.

DESCRIPTION OF THE PREFERRED EMBODIMENT

Figure 1:
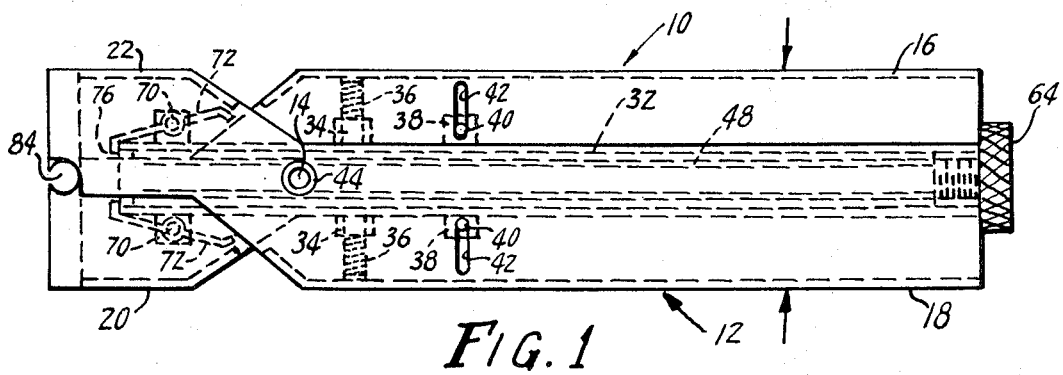
FIG. 1 is a side elevation of the device.

Referring to FIG. 1, the numerals 10 and 12 designate as a whole lever arms pivoted to each other as at 14 in a manner to be described. The right-hand ends of the levers 10 and 12 constitute operating lever arms 16 and 18, while the opposite ends 20 and 22 of such arms perform the controlling of the movement of the weights and the crimping thereof as described below.

Figures 3, 4, 5, 6, 7:
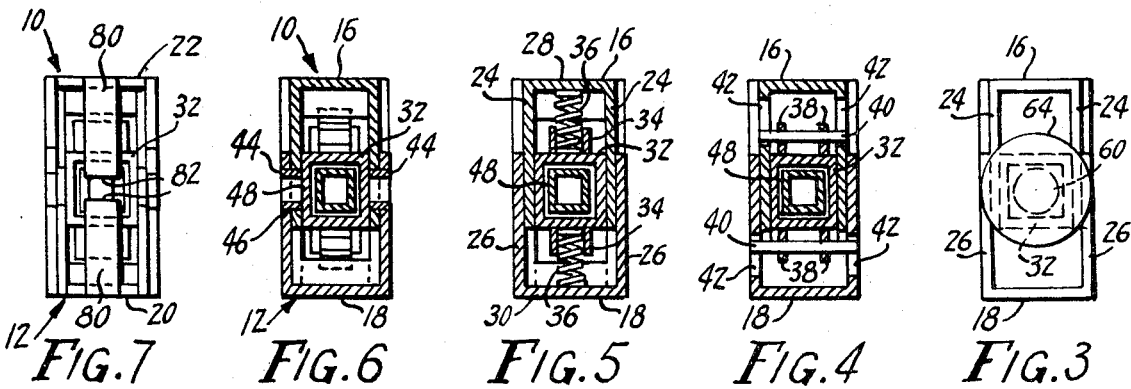
FIG. 3 is an end elevation looking in the direction of the line 3–3 of FIG. 2.
FIG. 4 is a transverse section on line 4–4 of FIG. 2.
FIG. 5 is a similar view on line 5–5 of FIG. 2.
FIG. 6 is a similar view on line 6–6 of FIG. 2.
FIG. 7 is an end elevation of the crimping end of the device as suggested by the line 7–7 of FIG. 2.

Referring to FIGS. 4, 5 and 6, it will be noted that the operating arms 16 and 18 are of U-shaped cross section comprising, respectively, sidewalls 24 and 26, the latter sidewalls sliding outwardly of and against the walls 24 so as to have in effect transversely of the device, a telescoping action. The U-shaped lever arms 16 and 18 are, respectively, provided with end walls 28 and 30.

Centrally of the lever arms is provided a member 32 in the form of a square tube, as shown in FIGS. 2, 4, 5 and 6. This tube may have its sidewalls in sliding engagement with the sidewalls 24 of the lever arms 16. The top and bottom walls of the tube 32 are provided with spring cups 34 receiving the inner ends of springs 36, and the outer ends of these springs, respectively, engage the lever arm walls 28 and 30 to bias the operating arms outwardly.

The top and bottom walls of the tube 32 are provided with clips 38 (FIGS. 2 and 4) and the clips above and below the tube 32 carry transverse pins 40 operating in slots 42 in the sidewalls of the operating arms to limit outward movement of these arms away from each other.

The tube 32 is provided with preferably tubular trunnions 44 (FIG. 6) adapted to rock in openings 46 in the sidewalls of the operating arms 28 and 30 to form the pivotal connection 14 referred to above.

Figure 2:
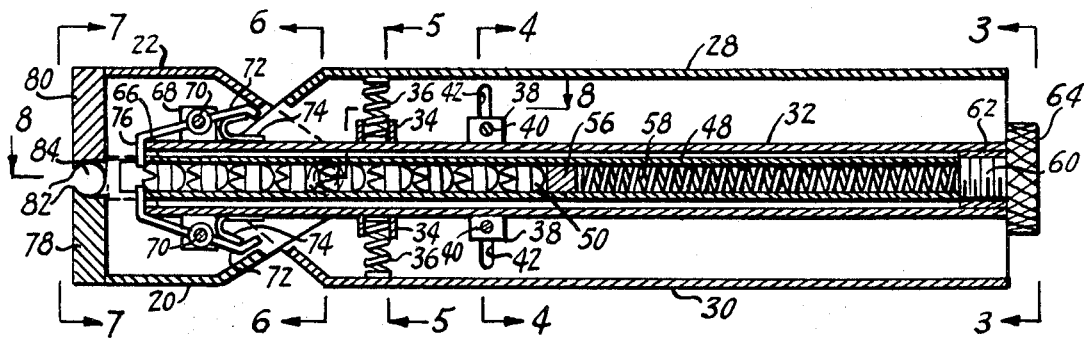
FIG. 2 is a longitudinal sectional view looking in the same direction as FIG. 1.
Figures 8, 9, 10:
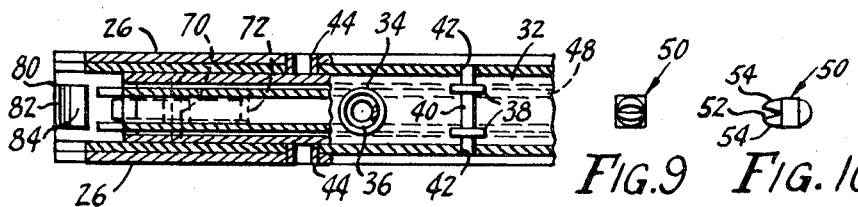
FIG. 8 is a fragmentary longitudinal section on line 8–8 of FIG. 2.
FIG. 9 is an end elevation of one of the weights.
FIG. 10 is a side elevation of one of the weights.

Arranged within the tube 32 is a weight cartridge 48, also of square cross section, and adapted to contain a plurality of weights 50 of square cross section, as shown in FIG. 9, so as to be slidable in the cartridge 48. These weights are preferably formed of lead and have one end split as at 52 forming fingers 54 adapted to be crimped about a fishing line in a manner to be described. The weights are in end-to-end relation in the cartridge, as shown in FIG. 2, and the end weight to the right in FIG. 2 is engaged by a follower 56 urged to the left by a spring 58 engaging a plug 60 threaded in a short tubular member 62 fixed in the tube 32. The plug 60 is preferably provided with a knurled head 64.

In the end of the tube 32 opposite the plug 60 is arranged stop blocks 66 to limit movement of the tube 48 to the left in FIG. 2. A loaded cartridge 48 is inserted into the device until the left-hand end engages the stop blocks 66, whereupon the plug 60 is screwed into position as further described below.

Adjacent the left-hand end of the tube 32 (FIG. 2) the top and bottom walls of each tube are provided with spaced clips 68 and between each pair of such clips is pivoted as at 70 a pair of fingers 72, the right-hand ends of which, as viewed in FIG. 2, are urged outwardly by spring clips 74. The other ends of the fingers 72 extend inwardly slightly beyond the stop plugs 66 as at 76 to act as a stop to prevent movement of the weights from the cartridge 48 until desired.

The ends 20 and 22 of the lever arms are provided with end blocks 78 and 80, respectively, having their adjacent edges extending inwardly as at 82 to effect the weight-crimping operation and they define a weight-receiving chamber 84 to receive each succeeding weight as these weights are ejected one at a time from the tube or cartridge 48.

OPERATION

The cartridges 48 are furnished with weights of somewhat varying sizes and have their ends provided with removable closure tapes. When it is desired to load a cartridge, the plug 60 is removed and with the device vertically arranged with the crimping edges 82 at the top, the tape is removed from one end of the cartridge and the latter inserted in the bottom of the tube 32. The tape is then removed from the other end of the cartridge, whereupon the spring 58 is inserted and the plug 60 screwed into position. It will be obvious that the plug 60 engages one end of the cartridge 48 and that the other end of the cartridge engages the stop plugs 60.

When it is desired to crimp a weight about a fishing line, the line is inserted in the chamber 84 transversely of the device and drawn taut. The handle portions or operating arms 16 and 18 are then moved together to their limit as indicated by the arrows in FIG. 1, whereupon the right-hand ends of the fingers 72 (FIG. 2) which lie adjacent portions of the lever ends 20 and 22, will be engaged thereby to move the finger ends 76 outwardly and release a weight 50 for ejection by the action of the spring 58 into the chamber 84, and a weight in the chamber 84 will be retained by the taut fishing line. The releasing of the arms 16 and 18 will release the fingers 72 to engage the next weight and retain it against ejection, whereupon the movement of the operating arms toward each other to a lesser extent than for releasing a weight from the cartridge will cause the crimping edges 82 to bend the fingers 54 (FIG. 10) to crimp the line in the notch 52. The arms are then moved apart to release the crimped weight. Thus, it will be apparent that successive weights may be crimped about successive lines until the cartridge is empty, whereupon the plug 60 is removed together with the spring 58. The empty cartridge 48 then may be removed from the device and discarded, and a new cartridge inserted in the device for subsequent operations. It will be apparent that the device provides for the rapid successive crimping of weights about fishing lines. The operation takes place far more rapidly and with greater ease than can be done by hand.

From the foregoing it will now be seen that there is herein provided an improved device for crimping weights on fishing lines which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interrupted merely as illustrative, and not in a limiting sense.

I claim:

1. A device for crimping about fishing lines lead weights having spaced fingers at one end comprising a pair of lever arms pivoted between their ends to form operating arms at one end and crimping arms at the other end for crimping the fingers of the weights together about a fishing line, means for feeding weights to said crimping end of the device from between said lever arms, said means for feeding said weights including a cartridge tube within said lever arms, and spring means for feeding weights through said tube to said crimping arms, a guide tube supported within said lever arms and within which said cartridge tube is arranged, aligned trunnions carried by said guide tube and projecting through said lever arms to pivotally connect said lever arms to each other, and pivoted fingers between said trunnions and said crimping arms engageable with the latter to release a weight for movement to said crimping arms upon each movement of said crimping arms towards each other and for engaging the next successive weight to prevent movement thereof upon movement of said operating arms away from each other.

2. A device according to claim 1 wherein said fingers are levers having one end engageable with each of said crimping arms, the other ends of said fingers projecting across the adjacent end of said guide tube to engage and stop the next advancing weight therein.

3. A device according to claim 2 provided with transversely aligned springs engaged between said guide tube and the respective operating arms.

4. A device for crimping about fishing lines lead weights having spaced fingers at one end comprising a pair of lever arms pivoted between their ends to form operating arms at one end and crimping arms at the other end for crimping the fingers of the weights together about a fishing line, means for feeding weights to said crimping end of the device from between said lever arms, said means for feeding said weights including a cartridge tube within said lever arms, spring means for feeding weights through said tube to said crimping arms, a guide tube supported within said lever arms and within which said cartridge tube is arranged, aligned trunnions carried by said guide tube and projecting through said lever arms to pivotally connect said lever arms to each other, said means for feeding said weights including said operating arms wherein feeding occurs only after the squeezing of said operating arms toward each other, and means connected to said crimping arms including a plate carried by each of said crimping arms having a concave depression 82 in the upper surface of said plate engageable with the fingers of each successive weight to hold the weight in position for putting a line through the fingers of the weight and then to crimp the fingers together upon further movement of said operating arms toward each other.

5. A device according to claim 4 wherein said concave depression 82 of each said plate oppose each other to form a space forming a weight receiving chamber.